TRANSPARENT FILING ENVELOPE WITH INDEX

Filed Nov. 6, 1967 2 Sheets-Sheet 1

INVENTOR.
HARRY E. MATTON
BY Church & Rogers
PATENT AGENTS

TRANSPARENT FILING ENVELOPE WITH INDEX

Filed Nov. 6, 1967 2 Sheets-Sheet 2

INVENTOR.
HARRY E. MATTON
BY Church & Rogers
PATENT AGENTS

United States Patent Office 3,459,361 Patented Aug. 5, 1969

3,459,361

TRANSPARENT FILING ENVELOPE WITH INDEX

Harry E. Matton, 24 Nelles Road S., Grimsby, Ontario, Canada

Filed Nov. 6, 1967, Ser. No. 680,892
Int. Cl. B65d *31/12*
U.S. Cl. 229—56 3 Claims

ABSTRACT OF THE DISCLOSURE

A transparent tabbed envelope suitable for phonograph records and the like comprises a smaller pocket to receive the tab joined to a larger pocket along one edge by a flexible junction; the opening to the larger pocket is along the edge thereof in the immediate neighborhood of the said junction.

Field of the invention

This invention is concerned with improvements in or relating to transparent filing envelopes and especially, but not exclusively, to such envelopes intended for the filing or storing of phonograph record albums and the like.

Description of the prior art

The common method of filing or storing record albums in retail stores is to place a number of record albums in a bin type box, and to move each individual record album to see the title and/or other pertinent information. The home consumer method of filing or storing record albums usually consists of a wire rack holder, either disposed in some form of container or on an open shelf, and again this method is unsatisfactory because in the absence of a title on the spine of the cover it necessitates removing each record album from the rack in search of a particular selection. In addition to this inconvenience, the record albums become dusty and soil very easily.

Summary of the invention

It is an object of the invention to provide a new transparent envelope with index, especially suitable for filing or storing of record albums.

It is a particular object to provide a new transparent filing envelope with index that provides a simple efficient way for cataloguing and storing a collection of phonograph record albums.

In accordance with the present invention there is provided a transparent tabbed envelope suitable for phonograph record albums and the like comprising a larger pocket for the reception and accommodation of the said phonograph record album and the like, and a smaller elongated pocket of the same material as the said larger pocket, formed integrally therewith, and for the reception and accommodation of a corresponding tab insert, characterised by the said smaller pocket having a junction with the larger pocket along one of its longer sides, being flexible relative to the larger pocket about the said junction, the smaller pocket being permanently openable at one of its shorter sides for the reception therein of the said tab insert, and the larger pocket being permanently open at its side in the immediate neighbourhood of and parallel to the said junction.

I have found that the disadvantages and inconveniences of the known filing and storage methods may be overcome by using a transparent envelope with an index tab in accordance with this invention. Because the index tab is always visible, and because it is flexible relative to the larger pocket, there is no need to remove the envelope containing the record album from its filing or storage place or position in order to see the title. Once a selection has been made by searching through the index tabs, the envelope can be taken out so that the record disc can be played. All the information contained on the face or the back of the record album is visible through the transparent walls of the envelope.

It is an important feature of my transparent envelope that the opening of the large pocket which contains the phonograph album runs parallel and in line with the index tab pocket. This idea permits the envelope to be filed or stored in an upward position as well as in a sideways position with equal effectiveness, because the tab is always visible and flexible in either direction. The tab index, containing all the pertinent information, is inserted in the tab pocket by cutting the sealed end of the tab pocket diagonally with a pair of scissors. The material from which the envelope is made may be any suitable type of transparent material. I have found that clear polyethylene film of four mils thickness to be most satisfactory, because it provides sufficient strength and rigidity.

Description of the preferred embodiments

Figures 1, 2:
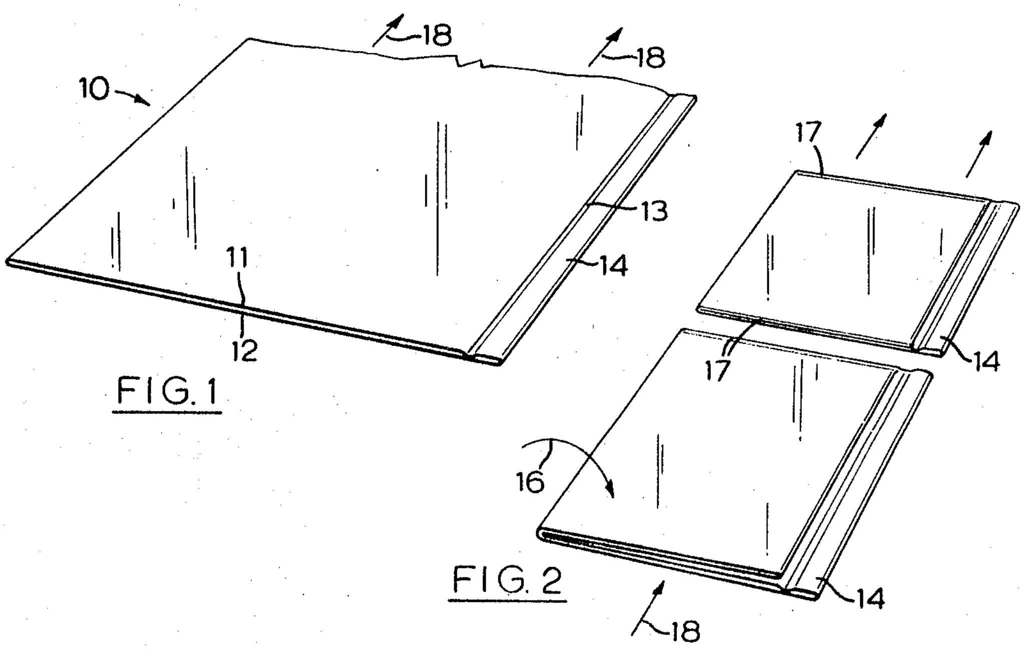
FIGURE 1 is a general perspective view from above to illustrate an initial step in the production of an envelope in accordance with the invention from tubular polyethylene.
FIGURE 2 is a similar view to FIGURE 1, and showing subsequent steps in the production of the envelope.
Figure 4:
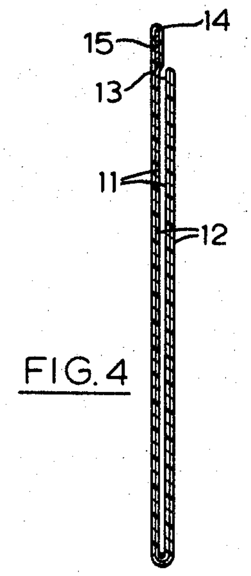
FIGURE 4 is a section of the said first embodiment, taken on the line 4—4 of FIGURE 3.
Figure 3:
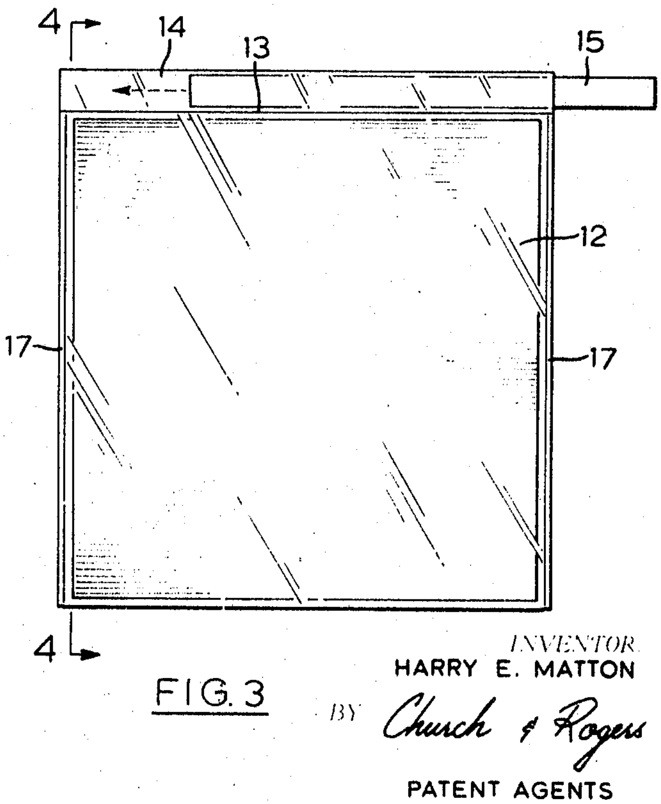
FIGURE 3 is a front elevation of a first embodiment.

The same reference number will be used for similar parts in all the figures of the drawings. The envelope illustrated in FIGURES 3 and 4 is a double wall flat style embodiment, and is constructed from polyethylene tubing, by a process comprising a series of folds and heat seal applications generally illustrated by FIGURES 1 and 2. In this process the tube 10 is laid out flat upon a suitable supporting table (not illustrated) and the two walls 11 and 12 are sealed together by a line heat seal 13, closely adjacent to one folded edge thereof, thereby forming the small index pocket 14 adapted for the reception of a long narrow index tab 15. The large pocket of the envelope is formed by folding the larger portion of the tube material over in half, less the depth of the small pocket, until the other folded edge of the tube is in the immediate neighbourhood of the seal 13, as indicated by the arrow 16 in FIGURE 2, and heat sealing the two edges 17. It will be seen that such envelopes can be produced in a continuous process by moving the tube continuously in its direction of tubular elongation, as indicated by the arrows 18 in FIGURES 1 and 2, first effecting a continuous linear seal 13, thereafter continuously folding over the tube while it continues to advance, and by a combined sealing and cutting operation, simultaneously heat sealing the rearward edge 17 and severing the portion of the tube forward of said rearward edge from the remainder of the tube to form the finished envelope.

Another way in which the envelope can be formed is, for example, by cutting a piece from a tube of transparent material by cuts extending transverse to its direction of tubular elongation, folding the thus separated piece of tube generally parallel to the said direction so that there are two transversely spaced parts of the tube parallel to one another with one part longer than the other, and with their cut edges 17 aligned with one another, sealing together the aligned edges 17 to provide the permanently open larger pocket with the longer tube part projecting beyond the permanently open side, and sealing together the two walls of the projecting longer part of the tube along the line 13, which is in the immediate neighbourhood of the permanently open side of the larger pocket, to constitute the required junction and form the pocket 14 from the projecting longer part of the tube.

Such an envelope has the particular advantage that it is formed continuously from readily available material of constant thickness; the tab pocket which requires relatively little strength is formed from a single thickness of the material, while the record receiving pocket which requires considerably more strength because of the usage thereof is formed automatically from a double thickness of material and is consequently much stronger. The tab pocket is readily flexible relative to the larger pocket in either direction, about the junction formed by the heat seal 13. In this method of manufacture both ends of the tab pocket are sealed and one of the sealed ends must be cut before the tab 15 can be inserted therein.

Figure 6:
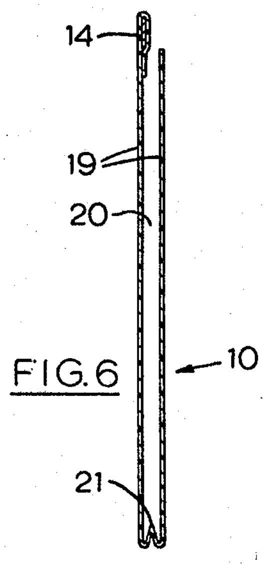
FIGURE 6 is a section of the said second embodiment, taken on the line 6—6 of FIGURE 5, and FIGURES 7 to 9 are respective perspective views of three different types of container for the reception of the transparent envelopes in accordance with the invention, and showing the way in which the envelopes may be employed for storing a record collection.
Figure 5:
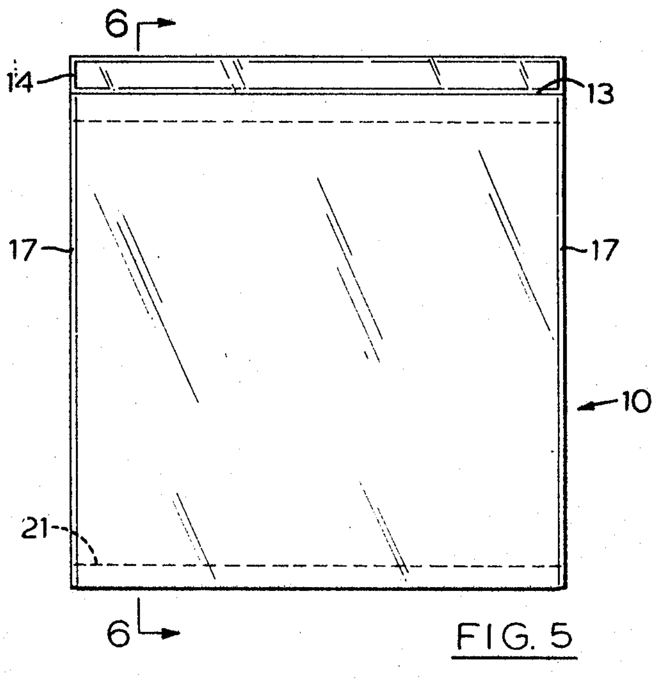
FIGURE 5 is a front elevation of a second embodiment.

The envelope 10 illustrated in FIGURES 5 and 6 is a single wall, bottom-gusset second embodiment, and is constructed from polyethylene sheeting 19 by a series of folds and heat seal applications. An envelope is thereby formed that has a large pocket 20 with a gusset 21 at the bottom, such a large pocket being capable of holding two or more record albums, and a smaller pocket 14 for receiving an index tab. The smaller pocket is formed by folding one edge portion of the material over as illustrated, and then sealing the said edge to the adjacent part of the sheet by a line seal 13. The large pocket is formed by folding over the remainder of the sheet until the other edge is in the immediate neighbourhood of the seal 13, and then heat sealing both the outer edges 17. It will be apparent that such an envelope also can be produced by a continuous process as with the first embodiment.

Figure 7:
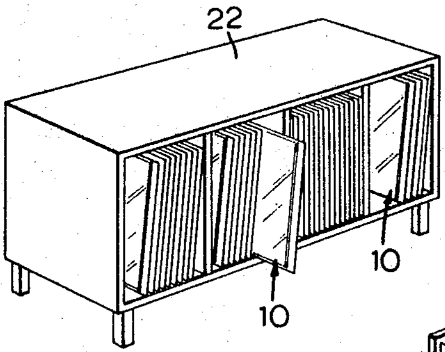
Figure 8:
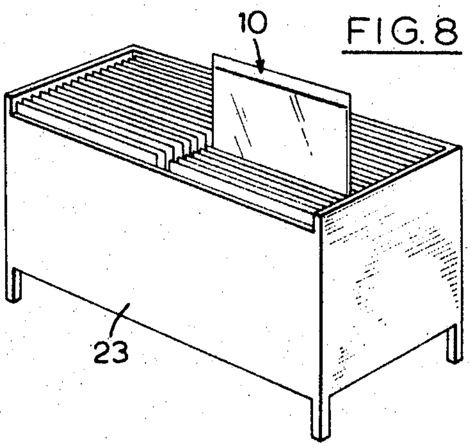
Figure 9:
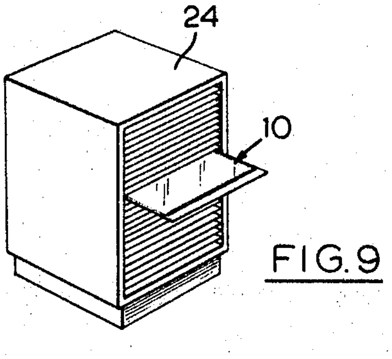

FIGURE 7 of the attached drawing shows the manner in which records may be stored vertically in a suitable container or cabinet 22, with the albums standing on one edge, and with the index pockets and tabs extending vertically. FIGURE 8 shows an arrangement comprising a cabinet 23 in which the envelopes are stored vertically, the albums standing on one edge and the index tabs extending horizontally. FIGURE 9 illustrates a storage compartment 24 of pedestal type in which the envelopes are stored horizontally on respective shelves, the albums lying on their faces with the index tabs extending horizontally. In all of these arrangements the flexibility of the tab pocket relative to the larger pocket permits the information on the tab inside the pocket to be examined easily without the need for removing the envelopes from the compartments. It will also be apparent from each of the FIGURES 7 to 9, that in all of the different ways in which the envelopes are stored, and are withdrawn from the container when required, there is no possibility of the record album being held in the container and pulled from the envelope as the latter is withdrawn, because of it being wedged between immediately adjacent albums. Moreover, there is no tendency for the album to fall out of the larger pocket as the envelope is withdrawn.

What I claim is:

1. A transparent tabbed envelope with index pocket suitable for phonograph record albums and the like, comprising a larger pocket for reception and accommodation of the said phonograph record album and the like, and a small elongated pocket of the same material as the said larger pocket, formed integrally therewith, and for the reception and accommodation of a corresponding tab insert, characterised by the said smaller pocket having a junction with the larger pocket along one of its longer sides, the said smaller pocket being permanently openable at one of its shorter sides for the reception there in of the said tab insert, and the larger pocket being permanently open at its side which is parallel to and coincides with said junction between the smaller and larger pockets.

2. An envelope as defined in claim 1, in which the bottom portion of the larger pocket has a gusset.

3. An envelope as claimed in claim 1, characterised in that it comprises a piece of tubular transparent material in flattened conformation to be of double thickness with two parallel end edges, and folded parallel to the direction of tubular elongation thereof to have two transversely-spaced, double-wall parts parallel to one another with their side edges aligned and with one part longer than the other, a line seal extending in said direction of tubular elongation and sealing together the two walls of the longer double-wall part closely adjacent the respective one of said end edges and in the neighbourhood of the other end edge to constitute the said junction and to form a single-walled smaller pocket between the line seal and the said closely adjacent end edge, and side edge seals sealing together the said aligned side edges, whereby the said larger pocket is double-walled with its opening disposed between the said line seal and the neighbouring other end edge.

References Cited

UNITED STATES PATENTS 2,265,075 12/1941 Knuetter.
2,777,574 1/1957 Brody -------------- 206—62

FOREIGN PATENTS 634,488 1/1962 Canada.

DAVID M. BOCKENEK, Primary Examiner

U.S. Cl. X.R.

206—62; 229—72